United States Patent Office 3,461,205
Patented Aug. 12, 1969

3,461,205
PROCESS OF EXTRACTING PROTEINS FROM POTATOES
Viktor Mansfeld, Josef Hladovec, and Zdenka Horakova, Prague, Czechoslovakia, assignors to Spofa Sdruzeni Podniku pro Zdravotnickou Vyrobu, Prague, Czechoslovakia
No Drawing. Continuation-in-part of application Ser. No. 189,721, Apr. 24, 1962. This application Apr. 20, 1966, Ser. No. 543,796
Claims priority, application Czechoslovakia, Apr. 26, 1961, 2,576/61
Int. Cl. C07g 7/022; A61k 27/00
U.S. Cl. 424—195                                    15 Claims The present application is a continuation-in-part of our copending application Ser. No. 189,721, filed Apr. 24, 1962, now abandoned, and entitled, "Method of Preparing a Substance With Antiphlogistic Effects."

The present invention relates to a therapeutic agent and a method of making and using the same.

More particularly, the present invention is concerned with a therapeutic agent having antiphlogistic or anti-inflammatory properties, which agent may be used in the treatment of a variety of, preferably non-infectious, acute inflammatory processes and lends itself for parenteral as well as local administration.

It has been proposed to fractionate potato extracts at the isoelectric point by precipitation with ammonium sulfate. In this manner a proteinaceous extract is obtained possessing antitrypsinic activity.

For this purpose proteinaceous fractions were obtained by extracting crushed potatoes with water at a pH of between 8 and 9, acidifying the extract to a pH of between 2 and 3, separating the thereby formed precipitate and adjusting the liquid portion to a pH of between 4.3 and 4.8, whereby a precipitate of undesired constituents of the extract is formed and eliminated. Thereafter, the remaining liquid portion is subjected to precipitation by salting out with a soluble salt, preferably ammonium sulfate or also sodium chloride, magnesium sulfate or the like.

However, the usefulness of the thus isolated proteinaceous fraction is limited.

It is therefore an object of the present invention to provide a therapeutic agent, a method of making and a method of using the same, which agent is derived from a potato extract and possesses high antiphlogistic activity while being non-toxic, non-antigenic and non-pyrogenic.

It is a further object of the present invention to provide a therapeutic agent and a method of making the same, which agent is derived from a potato extract and is essentially a polypeptide, preferably having a molecular weight of between 2000 and 3000 and a significant inhibitory activity with respect to chymotrypsin.

Other objects and advantages of the present invention will become apparent from a further reading of the description and of the appended claims.

With the above and other objects in view, the present invention contemplates a method of preparing a therapeutic substance having antiphlogistic properties and consisting essentially of polypeptides, comprising the steps of extracting pulped raw potatoes so as to obtain a slightly alkaline, substantially solids-free, proteinaceous aqueous extract, acidifying the extract to a pH of about 2.5, thereby forming a precipitate in the contact, removing the precipitate, raising the pH of the thus obtained precipitate-free extract to the isoelectric point of a relatively easily precipitable portion of the proteins contained in the extract so as to precipitate the portion, removing the thus precipitated portion thereby obtaining a substantially clear proteinaceous extract, adding to the thus obtained extract a soluble salt adapted to salt out the remaining proteinaceous fraction of the extract, the salt being added in an amount sufficient to salt out at least the major portion of the remaining proteinaceous fraction, thereby forming a precipitate of the latter, recovering the thus formed proteinaceous precipitate, dissolving the recovered precipitate so as to form an acidic aqueous solution of the same, further purifying the acidic solution so as to eliminate therefrom substantially all dissolved constituents with the exception of polypeptides having a molecular weight of up to about 3000, thereby obtaining a substantially pure aqueous solution of the polypeptides, and recovering the polypeptides from the solution.

The present invention also includes the product obtained by the above described method and, furthermore, the present invention is concerned with a method of treating a patient suffering from an acute inflammatory condition, comprising the step of administering to the patient the product obtained according to the method of claim 1.

According to the present invention, a proteinaceous fraction which has been obtained from a potato extract by precipitation, for instance, with aluminum sulfate in accordance with the above-discussed suggestion, is further treated by being dissolved in water at a pH of between 2 and 3, the thus formed solution then passed through a column filled with neutral anhydrous aluminum oxide, the effluent from the column, at a pH of between 3 and 4, treated with a soluble salt, preferably sodium chloride so as to form a precipitate which is then dissolved in water and from which undesirable proteins are eliminated by heating and then separated, whereupon the remaining solution, preferably after dialysis against water, is dried so as to obtain the antiphlogistic substance. Drying preferably is carried out by lyophilization.

It is also within the scope of the present invention to replace the passage through the alumina column by a precipitation of undesirable constituents of the solution which is carried out with a lower alcohol preferably ethanol as precipitating agent, or to combine the alumina treatment and the ethanol or the like precipitation.

Thus, according to the present invention, the previously suggested ammonium sulfate fractionation is followed by fractionation with ethanol or the like and/or passage through an alumina column.

It is thus also possible to proceed in such a manner that the proteinaceous fraction obtained according to the prior suggestions is dissolved in water at a pH of between 1 and 5 and a precipitate is formed by the addition of a water miscible organic solvent such as an alkanol with 1-3 carbon atoms and/or a ketone with 3-5 carbon atoms to the solution. After removal of the precipitate, a solution of the substance having antiphlogistic activity is thus obtained, and the active substance is then isolated from the liquid phase by evaporation of the solvent, generally in aqueous liquid. Evaporation or drying is preferably carried out by lyophilization.

In this manner, an antiphlogistic agent is produced which is essentially a polypeptide having a molecular weight of between 2000 and 3000, dialyzes through a membrane, is partly thermostable and inhibits chymotrypsin. The term "partly thermostable" is meant to indicate that the thus obtained biologically active substance is stable in 1% aqueous solution at boiling temperature for 5 minutes, or for one hour at 80° C. without losing its biological activity.

The agent which is thus isolated by lyophilization, may be administered parenterally or locally.

In the case of parenteral administration, preferably between 2 and 4 ampoules are daily administered intravenously for a period of between 3 and 7 days. Each ampoule may contain between 50 and 100 mg. of the lyophilized substance, dissolved in 5 ml. saline solution.

It is also possible to administer the antiphlogistic agent of the present invention by infusion, for instance dissolved in 200 ml. of saline solution.

In the case of local administration, pads which are wetted with a 0.01–0.1% solution of the antiphlogistic agent of the present invention are exchanged every four hours for a period of between 3 and 6 days.

If necessary, the above described treatment can be repeated.

It has been found that parenteral administration of the antiphlogistic agent of the present invention is frequently indicated in cases of fresh thrombophlebitis, opthalmological acute inflammatory affections, dermatological acute inflammatory affections, burns and other acute inflammatory processes, and generally in the case of inflammatory processes which, preferably, are non-infectious.

Indications for local administration of the antiphlogistic agent of the present invention include dermatological acute inflammatory affections, exacerbations eczema chronicum, ulcus cruris, epidermolysis bullosa, pemphigoid, and some types of stomatitis and gingivitis.

Where in such cases prior to administration of the antiphlogistic agent of the present invention signs of acute inflammation are observed, such as rubor, calor, dolor or tumor, and also moistening of the skin, these indications of acute inflammation quickly decrease or disappear upon administration of the antiphlogistic agent of the present invention so that the objective and subjective condition of the patient is improved, in most cases leading to full recovery after relatively short hospitalization.

Preferably, the antiphlogistic therapeutic agent of the present invention, which is now available in Czechoslovakia under the trade name "Inhibin" may be administered intravenously in amounts of 1–2 mg./kg. (of the patient's weight) in 5 ml. of saline solution (i.e., physiological salt solution) pro dosi, 3–6 mg./kg. pro die as single injections or infusions (200–500 ml. of saline solution, 1–2 mg./kg). The usual duration of this therapy is between 2 and 4 days, and it may be repeated.

Infiltrations preferably may be administered subcutaneously, in amounts of 1–2 ml. of a 1% solution of the antiphlogistic agent in saline solution, into the gingival or other foci of infection.

External administration preferably will be by means of pads wetted with 0.5–1.0% solution, 2–3 times daily, each time for one hour.

Generally, it may be said that treatment with the antiphlogistic agent of the present invention is indicated in case of acute inflammatory conditions, particularly non-infectious conditions of this kind, including edema, reddening, tenderness. After several days of administration in most cases all signs of acute inflammation will disappear. Main indications include: acute thrombophlebitis, conjunctivitis, chorioretinitis, acute exacerbations of skin eczema, ulcus cruris, etc.

The active agent may be separated from the pretreated solution containing the same by dialyzing the same, either merely through a membrane, or in an electric field against water, whereby the pure polypeptic component having a high antiphlogistic activity, will pass into the water. Therefrom it can be isolated by lyophilization.

The antiphlogistic agent of the present invention is soluble in trichloro-acetic acid and will give a reaction with ninhydrin. Upon being subjected to paper electrophoresis, the polypeptides forming the active agent will migrate into the homogeneous zone, and electrophoresis according to the Tiselius method, will show three fractions.

The antiphlogistic agent obtained according to the present invention possesses highly advantageous pharmacological properties, it is non-irritating and does not affect the blood pressure. It may also be used for parenteral treatment of certain rheumatic diseases and various dermatitides in addition to the conditions mentioned further above.

The following examples are given as illustrative only, without limiting the invention to the specific details of the example. At the beginning of each example, the important features thereof are enumerated. Example I describes the preparation of an intermediate product substantially as previously suggested which intermediary product is then further processed in accordance with the present invention, as described in Examples II–IV.

EXAMPLE I (1) potatoes 20 kg., pulped
(2) extraction at pH 8.5 with 6.4 liters of water
(3) separation, forming 14.0 liters extract—solids removed
(4) acidification to pH 2.5
(5) separation 13 liters—precipitate removed
(6) adjustment to pH 4.5 (isoelectric point)—precipitate formed
(7) centrifuging 13.0 liters—precipitate removed
(8) precipitation, with 3.4 kg. aluminum sulfate
(9) centrifuging to obtain 40 grams wet proteinaceous fraction—liquid removed The thus-obtained wet proteinaceous fraction (9) represents the starting material for the processes according to the present invention which are described in Examples II–IV.

According to the present example which, per se, does not describe the process of the present invention but only the preparation of the starting material, in step (1) 20 kg. of fresh, sound potatoes are perfectly cleaned of all impurities, washed with lukewarm water, the temperature of which must not exceed 70° C. in order to avoid denaturation of protein, and then ground to a fine pulp, preferably having particle sizes of between 1 and 2 mm.

In step (2), the thus formed pulp is mixed with 6.4 liters of water and the pH of the solution adjusted to 8.5 by the addition of 1 N sodium hydroxide solution. Preferably sodium hydroxide solution is used for this purpose, however, it would be obviously also possible to use other similarly acting alkaline substances, for instance a potassium hydroxide solution. Unless otherwise indicated, the actual pH may be ±0.2 of the values indicated in the examples. Thus, by describing a pH of 8.5 above, it is intended to indicate that the pH may be adjusted to within a range of between 8.3 and 8.7.

After following the extraction of the pulp in the alkaline aqueous liquid to continue for one hour, the pulp is removed in step (3) by centrifuging or by filtration through a thin cloth sheet.

A brown-black extract solution is obtained in which some starch is suspended. However, the suspended starch will settle at the bottom upon allowing the centrifuged or filtered liquid to stand for about one hour and, according to step (4), the supernatant liquid, amounting to 14.0 liters is then drawn off and adjusted to a pH of 2.5 by the addition of diluted (1:1) hydrochloric acid. Thereby huminic substances conglomerate and settle down, thereby facilitating removal thereof. In the solution remains the soluble proteinaceous complex including the pharmacodynamically active fractions. Upon separation of the precipitate, for instance by filtering or centrifuging (5), 13.0 liters of a filtrate are obtained for further processing.

The solution passing from step (3) to step (4) apparently contains the bulk of the soluble proteinaceous substances which during the further process steps of the present example, combined with the process steps of one of Examples II–IV are subjected to further separation and purification. In general, all of the steps serve for gradual separation or isolation of the desired product under varying conditions, which effect could not be achieved by any single operation or process step.

A 3 N-sodium hydroxide or the like solution is added in order to adjust the pH of the now formed 13.5 liters of bright brown liquid to 4.5, which is the isoelectric point of part of the proteinaceous fraction thereof and which is deeply colored with phenolic oxidation products. The adjustment of the pH must be made rather accurately to the isoelectric point of these proteins which are inactive for the purpose of the present invention, step (6), such as to between 4.4 and 4.6. Upon reaching this isoelectric point, the inactive proteinaceous fraction which by the previous more severe acidification has been brought into a labile condition, is precipitated. There remains in the solution the soluble biologically active protein in partly purified condition.

The thus formed precipitate is then prepared in step (7) by centrifuging, and the thus obtained 13 liters of clarified brown solution are salted out in step (8), with ammonium sulfate, sodium chloride, magnesium sulfate or the like but preferably with 3.4 kg. of solid ammonium sulfate, so that only non-proteinaceous substances and coloring substances from the original potato extract remain in the solution.

Upon subsequent centrifuging according to step (9) the salted out proteinaceous fraction is separated from the liquid and it will be found that by proceeding as described above, 40 grams of a wet proteinaceous fraction are obtained which will serve as the starting material for the process of the present invention which is described in Examples II–IV.

The wet fraction or precipitate contains (a) proteinaceous material having a molecular weight of about 50,000 (determined on Sephadex) and shows inhibitory activity against various proteases, and (b) lower peptides with a molecular weight of below 3000 and significant antiphlogistic activity.

EXAMPLE II (A–10) dissolving proteinaceous fraction obtained according to (9) in 2 liters pH 2, clarifying
(A–11) 1.8 liters over alumina column
(A–12) precipitation w. 378 g. NaCl
(A–13) precipitation completed at pH 3
(A–14) centrifuging 25 gr.—liquid removed
(A–15) dissolving in 250 ml. heat denaturation
(A–16) centrifuging 250 ml.—precipitate removed
(A–17) dialysis with 4×250 ml. sq.—dial. drain removed
(A–18) lyophilization to obtain 2 g. of antiphlogistic agent The preliminary steps of Example I were indicated as steps 1–9.

The steps of each of Examples II–IV start with step 10, however, the steps of Example II are indicated by the prefix A, of Example III by the prefix B and of Example IV by the prefix C.

Clarifying in step (A–10) is carried out by centrifuging at 4000 r.p.m.

As indicated above in the enumeration of the steps of the present example, in a first step (A–10), the proteinaceous fraction obtained according to step (9) of Example I is dissolved in 2000 ml. of water containing between 1 and 2% ammonium sulfate, and is acidified with dilute hydrochloric acid to a pH of 2.0, and clarified. In view of the next following step, chlorine ions are required and, for this reason, acidification is preferably carried out with hydrochloric acid. The main purpose of this step is the dissolution of the proteinaceous fraction obtained according to (9).

A pH range of between 1.8 and 2.2 appears essential for successfully carrying out the subsequent passage through the alumina column.

The thus formed solution flows then, according to step (A–11), through a column having a diameter of 30 mm. and a height of 400 mm. and filled with 200 g. of aluminum oxide. The alumina has been previously activated with hydrochloric acid, neutralized and heated up to complete expulsion of water therefrom. Thereby the pH of the solution will rise to between 7.8 and 8.2.

In this manner, a pale yellow solution is obtained having a pH of 8, which solution is salted out, according to step (A–12) with 378 g. of sodium chloride.

While sodium chloride is preferred for salting out the eluate coming from the alumina column it is also possible to use other salts for this purpose, for instance ammonium sulfate, ammonium chloride, sodium sulfate, magnesium sulfate, ammonium acetate or lead acetate. However, sodium chloride is economically preferable, and its ions which eventually remain in the solution are physiologically harmless.

In order to obtain complete precipitation or salting out, the pH is adjusted with hydrochloric acid to a value of 3 (A–13) or below. The precipitate is formed at a pH of 3 or below. Within the weak acid having a pH higher than 3 and up to the alkaline pH range, the precipitate formed in the saturated sodium chloride solution is soluble.

In step (A–14) the precipitate formed by the salting out process is separated, preferably by centrifuging, and 25 g. of the precipitate are thus recovered. The thus obtained precipitate is free of the coloring substances which, generally, tenaciously cling to all potato extracts. The precipitate consists predominantly of proteins with molecular weights below 10,000 (determined on Sephadex), showing a significant antiphlogistic effect.

The 25 g. of precipitate are dissolved in 250 ml. of distilled water (A–15) and placed for 15 minutes into a boiling water bath in order to denature and precipitate proteins. By this thermal denaturation, the proteinaceous fraction of a molecular weight of between about 10,000 and 3,000 will be precipitated, and the specific activity of the peptidic portion remaining in solution will be increased.

The precipitated proteins form a sediment and are then eliminated (A–16), by decantation, or, preferably, by centrifuging.

There remain in the solution the active peptides which, preferably, are further purified by dialyzing the solution (A–17) for 4 subsequent days, each day with 250 ml. water, whereby the active peptides will dialyze through the diaphragm into the aqueous medium. The low molecular peptides having a molecular weight of less than 3000 will pass through the dialyzation membrane, for instance the "Dialysierschlauch" made by Kalle & Co., Wiesbaden, Germany, into distilled water, while compounds of higher molecular weight which may still be present in the solution, are retained in the dialyzation space or tube. Thereby a considerable further purification is achieved. The dialyzation temperature should not exceed 10° C. Thus the above-described dialysis preferably will be performed in special cellophane tubing against running distilled water. For accelerating the process, electrodialysis may be applied.

The four dialyzates, amounting to 1000 ml. are then subjected to lyophilization (A–18) and thereby 2 g. of a residue are obtained which represents the therapeutic agent of the present invention in pure form. Lyophilization may be carried out for instance with the Czech standard apparatus available for this purpose, starting with a temperature of −40° C. and ending with a final drying temperature of +30° C. and a vacuum of between 50 and 200 microns Hg for a period of about 12 hours. The thus obtained product will contain between 1% and 3%, preferably not more than 2%, moisture.

The moisture content of the product should not exceed 3% in order not to impair its stability upon storage.

EXAMPLE III (B–10) dissolving proteinaceous fraction obtained according to (9) in 240 ml., pH 2.2
(B–11) precipitation with 960 ml. ethanol
(B–12) centrifuging 1200 ml.—precipitate removed
(B–13) evaporation under vacuum to 200 ml.
(B–14) centrifuging 200 ml.—precipitate removed
(B–15) lyophilization to obtain 4 grams of antiphlogistic agent According to step (B–10) the 40 g. of proteinaceous fraction obtained according to (9) of Example I are dissolved under stirring during a period of 2 hours in 240 ml. of water and acidified with dilute hydrochloric acid to a pH of 2.0. The purpose of this step is to dissolve the proteinaceous fraction and this is preferably carried out by stirring with water under gradual addition of the hydrochloric acid. No clarification is required at this point.

960 ml. ethanol are added to the thus formed solution under stirring (B–11) and thereby a precipitate will be formed.

While ethanol is preferred for this precipitation, it may be replaced by alkanols having between 1 and 3 carbon atoms or ketones having between 3 and 5 carbon atoms. Thus, for instance, methanol or ethanol may be used. However, ethanol appears to give the highest yields and also to be most advantageous from the point of view of economy and operational safety.

Thereby the undesirable high molecular weight proteins (molecular weights above about 3000) are precipitated and in solution remain predominantly the biologically active, low-molecular weight polypeptides which are soluble in 80% ethanol.

The precipitate is then removed (B–12) preferably by centrifuging, and thereby 1200 ml. of solution are obtained.

The ethanol is removed from this filtrate by being distilled off in vacuo (B–13) at a temperature of 30° C. (±3° C.), whereby 200 ml. of a solution containing some precipitated matter is obtained.

Since all ethanol has to be removed from the solution, the evaporation is continued until the entire ethanol has been distilled off. This, generally, is accomplished by evaporation of the solution to about ⅙ of its original volume.

In the next following step (B–14) the precipitate is removed from the solution, preferably by centrifuging, and the active agent of the present invention is recovered from the thus-obtained 200 ml. of clear solution by lyophilization (B–15) in a yield of about 4 g.

EXAMPLE IV (C–10) (see B–10) dissolving proteinaceous fraction obtained according to (9) in 240 ml. pH 2.2
(C–11) (see B–11) precipitation with 960 ml. ethanol
(C–12) (see B–12) centrifugation 1200 ml.—sediment removed
(C–13) (see B–13) evaporation of ethanol under vacuum to 200 ml.
(C–14) (see B–14) centrifugation 200 ml.—sediment removed
(C–15) (see A–11) passing the 200 ml. through alumina column
(C–16) (see A–12) salting out with NaCl (up to saturation)
(C–17) (see A–13) adjusting to pH 3 to complete precipitation
(C–18) (see A–14) centrifuging—liquid removed
(C–19) (see A–15) precipitate dissolved in 250 ml. water and heated for denaturing still present proteins
(C–20) (see A–16) centrifuging (250 ml.)—sediment removed
(C–21) (see A–17) dialysis with 4× 250 ml. aq.—dial. drain removed
(C–22) (see A–18) lyophilizing the fraction passed through the membrane into the 1000 ml. water (yield 2.0 g.)

As indicated above, the process of the present invention may also be carried out in accordance with the 13 steps (C–10) to (C–22), by combining certain steps of the process of Example III, namely steps (B–10) to (B–14), with certain steps of Example II, namely (A–11) to (A–18).

In connection with each of steps (C–10) through (C–22), there are indicated above the corresponding steps of either Example II or Example III, and a more detailed description of the respective steps will be found in Examples II and III.

According to the present example, the 40 g. of proteinaceous fraction obtained according to step (9) of Example I is dissolved (C–10) in 240 ml. of water by stirring for 2 hours and acidifying with dilute hydrochloric acid to a pH of 2.2.

960 ml. ethanol are then added under stirring (C–11) and thereby a precipitate is formed.

The thus formed precipitate is removed by centrifuging (C–12) and 1200 ml. of an aqueous ethanolic solution are thus obtained.

The thus obtained solution is then subjected to evaporation under reduced pressure so as to remove the ethanol by distillation (C–13), and in this manner 200 ml. of a residual aqueous solution will be formed, having precipitated matter dispersed therethrough.

In the next following step (C–14), the precipitate is removed, preferably by centrifuging, and the thus obtained 200 ml. of clear solution are then pressed in step (C–15) through an alumina column, as described in more detail in connection with step (A–11) of Example II.

The effluent from the alumina column is salted out with sodium chloride and the pH is adjusted to a value of 3 in order to achieve complete salting out in accordance with steps (C–16) and (C–17).

The liquid is now removed and the salted out product separated, preferably by centrifuging (C–18).

The thus separated precipitate is dissolved in 250 ml. distilled water and placed for 15 minutes into a boiling water bath (C–19), in order to achieve denaturation of still present proteins and thereby precipitation of the latter.

The denatured proteins are then removed by centrifuging (C–20) whereby 250 ml. of a clear liquid are obtained. This clear liquid contains the active peptides of the antiphlogistic agent of the present invention, which may be further purified by dialyzing the solution for 4 subsequent days, each day with 250 ml. of water (C–21), whereby the active peptides will dialyze through the diaphragm into the aqueous medium.

The dialyzates are then combined and lyophilized (C–22) in the manner described in more detail in connection with step (A–18) of Example II.

In this manner, 2 g. of a highly pure antiphlogistic agent are obtained.

While the process according to Example IV is somewhat more involved and requires more manipulative steps than the process of Examples II and III, it is the preferred process of obtaining in a relatively good yield a highly purified product in according with the present invention. Thus, the product obtained in accordance to Example IV is particularly suitable for parenteral, for instance intravenous, application, it is of pure white color, most active and free of impurities. The product obtained according to Example II is of a slightly yellowish color and in the average less active than that obtained by the processes of Examples III and IV.

The differences in the yield according to Examples II and IV (2 grams), and Example III (4 grams) are not attributed to different degrees of purity of the product, but rather to the difference in the effectiveness of precipitation with ethanol (Example III) and salting out with sodium chloride (Example II). In fact, the product obtained according to Examples III and IV are of higher purity than the product obtained according to Example II.

One of the advantages of the processes which include passage through the alumina column will be found in the much smaller volume to be passed through which makes the whole operation more efficient.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of preparing a substance having antiphlogistic properties, comprising the steps of
   (1) extracting pulped raw potatoes with water containing alkali metal hydroxide in an amount sufficient to maintain a pH of between 8 and 9, so as to form a slightly alkaline aqueous extract including dissolved proteinaceous material derived from said pulped potatoes;
   (2) acidifying said extract to a pH of between 2 and 3, thereby causing formation of a precipitate;
   (3) removing said precipitate from the residual extract;
   (4) adjusting the pH of the thus obtained residual, precipitate-free extract to between 4.3 and 4.8, thereby causing formation of another precipitate;
   (5) separating the last formed precipitate from the residual extract;
   (6) adding to the thus-obtained precipitate-free residual extract a salt which is soluble therein and capable of salting out a dissolved proteinaceous fraction of said extract so as to precipitate said proteinaceous fraction;
   (7) recovering the thus precipitated proteinaceous fraction;
   (8) dissolving the thus recovered proteinaceous fraction in a dilute aqueous solution of an ammonia salt maintained at a pH of between 2 and 3;
   (9) passing the thus-obtained solution containing said recovered proteinaceous fraction through a column of neutral anhydrous aluminum oxide;
   (10) adjusting the pH of the effluent from said column to between 3 and 4;
   (11) adding to the thus adjusted effluent a salt soluble therein and capable of salting out a proteinaceous fraction from said effluent, so as to precipitate said proteinaceous fraction;
   (12) recovering the last formed precipitate;
   (13) dissolving the recovered precipitate in water;
   (14) indirectly heating the last formed solution at boiling water bath temperature so as to precipitate a protein fraction therefrom;
   (15) separating the thus precipitated protein fraction from said solution;
   (16) dialyzing the thus-formed precipitate-free solution against distilled water; and
   (17) dehydrating the thus-formed precipitate-free solution,
thereby obtaining a residue consisting of said substance having antiphlogistic properties.

2. A method as defined in claim 1, wherein said soluble salt recited in step (6) is selected from the group consisting of ammonium sulfate, sodium chloride and magnesium sulfate.

3. A method as defined in claim 1, wherein said ammonium salt recited in step (8) is ammonium sulfate.

4. A method as defined in claim 1, wherein said soluble salt recited in step (11) is sodium chloride.

5. A method as defined in claim 1, wherein said dehydrating recited in step (13) is carried out by lyophilizing said precipitate-free solution.

6. A method as defined in claim 1, wherein said indirect heating recited in step (14) is carried out on a boiling water bath.

7. A method as defined in claim 6, wherein said soluble salt recited in step (6) is selected from the group consisting of ammonium sulfate, sodium chloride and magnesium sulfate; said ammonium salt recited in step (8) is ammonium sulfate; said soluble salt recited in step (11) is sodium chloride; and said dehydrating recited in step (13) is carried out by lyophilizing said precipitate-free solution.

8. A method as defined in claim 1, wherein said extracting of pulped raw potatoes is carried out within the proportions of about 20 kg. of pulped potatoes for each 6,400 ml. of water; said alkali metal hydroxide recited in step (1) is sodium hydroxide; said acidifying recited in step (2) is carried out with diluted hydrochloric acid; said adjusting of the pH recited in step (4) is carried out with aqueous sodium hydroxide; for each 20 kg. of pulped potatoes about 1,100 g. of the salt recited in step (6) are added; the dissolving recited in step (8) is carried out with about 2,000 ml. of said aqueous solution for each 20 kg. of pulped potatoes; about 442 g. of said salt recited in step (11) are added for each 20 kg. of pulped potatoes; and said dissolving recited in step (13) is carried out in about 5,000 ml. of water for each 20 kg. of pulped potatoes.

9. A method of preparing a substance having antiphlogistic properties, comprising the steps of
   (1) extracting pulped raw potatoes with water containing alkali metal hydroxide in an amount sufficient to maintain a pH of between 8 and 9, so as to form a slightly alkaline aqueous extract including dissolved proteinaceous material derived from said pulped potatoes;
   (2) acidifying said extract to a pH of between 2 and 3, thereby causing formation of a precipitate;
   (3) removing said precipitate from the residual extract;
   (4) adjusting the pH of the thus obtained residual, precipitate-free extract to between 4.3 and 4.8, thereby causing formation of another precipitate;
   (5) separating the last formed precipitate from the residual extract;
   (6) adding to the thus-obtained precipitate-free residual extract a salt which is soluble therein and capable of salting out a dissolved proteinaceous fraction of said extract so as to precipitate said proteinaceous fraction;
   (7) recovering the thus precipitated proteinaceous fraction;
   (8) dissolving the thus-obtained proteinaceous fraction in water at a pH of between 1 and 5;
   (9) adding to the thus-formed solution a water-miscible organic solvent so as to form a precipitate;
   (10) removing said precipitate from said solution; and
   (11) evaporating said organic solvent and withdrawing water from said solution,
thereby obtaining a residue consisting of said substance having antiphlogistic properties.

10. A method as defined in claim 9, wherein said water-miscible organic solvent is selected from the group consisting of alkanols with 1–3 carbon atoms and ketones with 3–5 carbon atoms.

11. A method as defined in claim 9, wherein said withdrawing of water is carried out by lyophilization.

12. The product obtained by the method of claim 1.

13. The product obtained by the method of claim 7.

14. The product obtained by the method of claim 8.
15. The product obtained by the method of claim 9.

References Cited

FOREIGN PATENTS 90,225   5/1959   Czechoslovakia.

OTHER REFERENCES

Cas. Lek., 1963, pp. 824–827, Novotny et al.
Arzneimittel Forschung, vol. 11, 1961, pp. 104–106, Hiadovec et al.
Chem. Abstracts, vol. 58, 1963, 1312g–h and 1313a, Belgian Patent 616,786 to Mansfeld et al.

WILLIAM H. SHORT, Primary Examiner
HOWARD SCHAIN, Assistant Examiner

U.S. Cl. X.R.

424—117; 260—112